US012802666B2

(12) United States Patent
Forough et al.

(10) Patent No.: US 12,802,666 B2
(45) Date of Patent: Nov. 17, 2026

(54) MUSICAL INSTRUMENT SUPPORTING DEVICE

(71) Applicants: Cyrus Forough, Northbrook, IL (US); Shahram Rezvani, Chatsworth, CA (US); Saeid Rezvani, Camarillo, CA (US)

(72) Inventors: Cyrus Forough, Northbrook, IL (US); Shahram Rezvani, Chatsworth, CA (US); Saeid Rezvani, Camarillo, CA (US)

( * ) Notice: Subject to any disclaimer, the term of this patent is extended or adjusted under 35 U.S.C. 154(b) by 0 days.

(21) Appl. No.: 19/046,669

(22) Filed: Feb. 6, 2025

(65) Prior Publication Data

US 2026/0229204 A1 Aug. 6, 2026

(51) Int. Cl.
*G10D 3/18* (2020.01)

(52) U.S. Cl.
CPC .................................... *G10D 3/18* (2013.01)

(58) Field of Classification Search
CPC ........................................................ G10D 3/18
See application file for complete search history.

(56) References Cited

U.S. PATENT DOCUMENTS

| | | | | | |
|---|---|---|---|---|---|
| 5,567,893 | A * | 10/1996 | Kun | G10D 3/18 | 84/280 |
| 6,369,303 | B1 * | 4/2002 | Hvezda | G10D 3/18 | 84/278 |
| 6,680,431 | B2 * | 1/2004 | Vanden | G10D 3/18 | 84/278 |
| 11,257,469 | B2 * | 2/2022 | Feldman | G10D 3/01 | |
| 2022/0122568 | A1 * | 4/2022 | Feldman | G10D 1/02 | |
| 2024/0386870 | A1 * | 11/2024 | Chang | G10D 3/18 | |

* cited by examiner

*Primary Examiner* — Christopher Uhlir
(74) *Attorney, Agent, or Firm* — Edward J Chalfie

(57) ABSTRACT

The present invention is an improvement to a musical supporting device that allows proper accommodation of various string musical instruments such as various sized violins, violas, etc. The musical supporting device includes a base, a pair of brackets and a securing means. The securing means includes a member which is slidable within a slot to position each of the pair of brackets linearly and radially.

6 Claims, 6 Drawing Sheets

MUSICAL INSTRUMENT SUPPORTING DEVICE

FIELD OF THE INVENTION

The present invention relates to a musical instrument supporting device. More particularly, the invention relates to an improvement to a musical instrument supporting device for instruments like violin etc.

BACKGROUND OF THE INVENTION

Shoulder rests of this type are useful in increasing the comfort of proper holding of the instrument, such as a violin or viola, by a player regardless of the physical build of the player such as the length of his neck and the configuration of his or her shoulders.

A U.S. Pat. No. 9,830,893 by Aldo Balatti discloses an adjustable and foldable shoulder rest for violin or viola. The shoulder rest of the invention includes two independently operable pull-tab adjustment mechanisms for independently adjusting, i.e. extending or retracting, the foldable forks. The prior art includes an adjustment mechanism in the clamps of the shoulder rest.

Another U.S. Pat. No. 5,270,474 by Joseph Kun discloses a shoulder rests for use with violins, violas or the like instruments. The invention provides a transverse inclination of the elongated base relative to the clamping forks to a limited angle.

Although the second prior art is an advancement on the first prior art by providing a pivotable and an axial movement. However, both the prior arts fail to disclose features of a securing means that can provide a linear movement and an axial movement to adjust a variety of musical string instruments according to the user providing more customization.

It is apparent that numerous methods and systems have been developed in the prior art that are adequate for various purposes. Furthermore, even though these inventions may be suitable for the specific purposes to which they address, they are not suitable for the purposes of the present invention as heretofore described. Therefore, there is a need for an improved attachment to a musical supporting device for musical string instruments like violin, viola etc.

SUMMARY OF THE INVENTION

The present invention discloses an improvement to a musical supporting device. Moreover, the invention provides the musical supporting device for violin or the like musical string instruments.

The primary objective of the present invention is to provide a musical supporting device. The musical supporting device includes a base having an undersurface formed to conform to the shoulder of a user. A pair of brackets secured to the base one at each end. The brackets clamp the shoulder rest to a respective violin or the like by engaging opposed side portions thereof. Each bracket includes two spaced apart clamping elements complementary with side portions of a respective violin and an intermediate support means disposed between the respective clamping elements for engaging bottom portion of the respective violin.

A securing means for securing the respective bracket to the base. The securing means includes a cylinder, a first member, a second member and a third member. The cylinder is placed within a slot of the securing means. The cylinder includes a first end, a second end and at least one radially disposed threaded socket for placing the bracket over. The first member is screwed within the slot to engage with the first end of the cylinder. The second member is screwed within the slot to engage with the second end of the cylinder, where the second member is screwed opposite to the first member. And the third member is screwed with the radially disposed threaded socket for affixing the bracket with the attachment to the musical supporting device.

Other objective of the present invention is the securing means providing a pivotal joint disposed between the clamping member and the base and allowing pivotal movement of the respective clamping member relative to the base. The movement is about a longitudinal axis generally parallel with the elongation of the base to thus allow the adjustment of a transverse inclination of the undersurface relative to the support plane. Moreover, the pivotal movement is about to an angle of from about 5° to about 25°.

Another objective of the present invention is to provide the securing means includes a thumb wheel, where the thumb wheel communicates with threaded portion of the first member. Moreover, the thumb wheel is rotated to extend and retract the first member so that the pair of brackets move.

Other objective of the present invention is to provide the first member is slidable within a slot in the instrument-facing side of the body to move the mounting bracket linearly and radially.

To the accomplishment of the above and related objects, the present invention may be embodied in the form illustrated in the accompanying drawings, attention being called to the fact, however, that the drawings are illustrative only, and that changes may be made in the specific construction illustrated and described that are within the scope of the claims.

Although, the invention is described herein in terms of various exemplary embodiments and implementations, it should be understood that the various features, aspects, and functionality described in one or more of the individual embodiments are not limited in their applicability to the particular embodiment with which they are described. Instead, they can be applied, alone or in various combinations, to one or more of the other embodiments of the invention, whether or not such embodiments are explicitly described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

BRIEF DESCRIPTION OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings.

DETAILED DESCRIPTION

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively.

Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a number of the elements, but can also mean a singular element.

Figure 1:
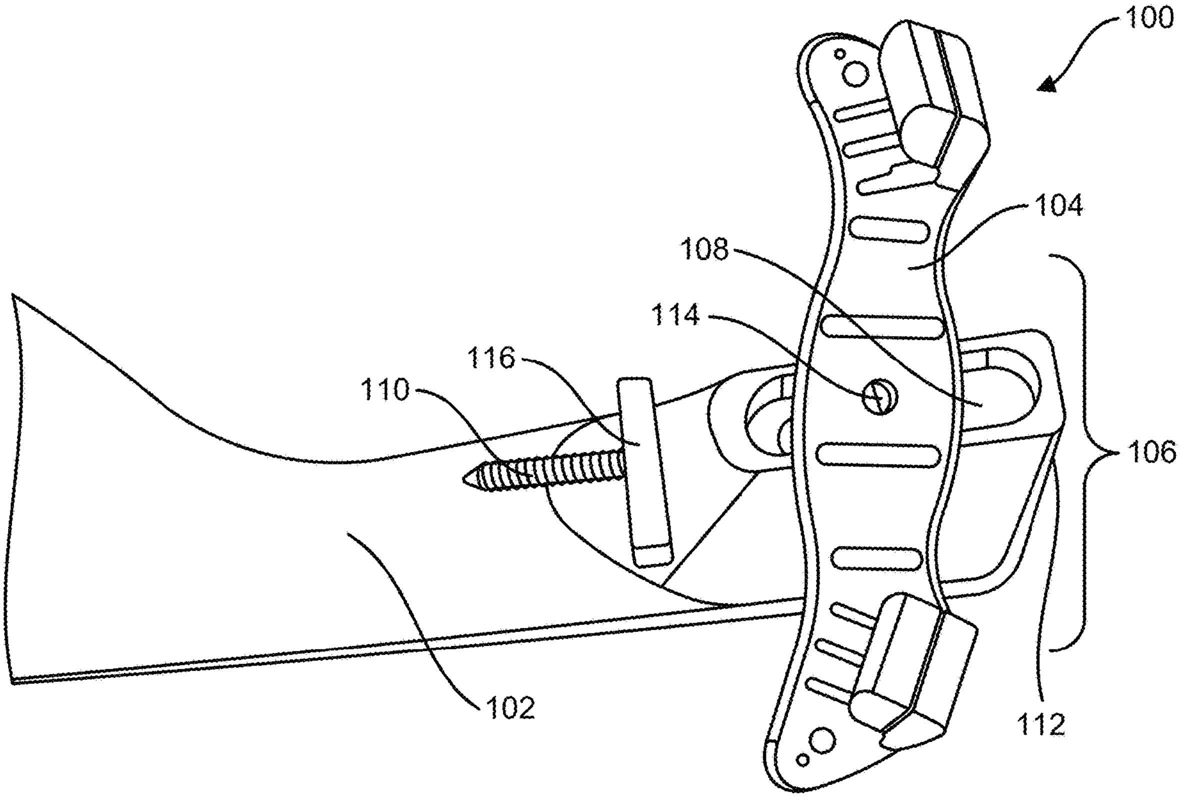
FIG. 1 illustrates a perspective view of an improvement to a musical supporting device in accordance to the present invention.

FIG. 1 illustrates a perspective view of an improvement to a musical supporting device. The musical supporting device 100 includes a base 102, a pair of brackets 104 and a securing means 106. The base 102 has an undersurface formed to conform to the shoulder of a user. A pair of brackets 104 secured to the base one at each end. Each of the bracket 104 of the pair of brackets clamp the shoulder rest to a respective violin or the like by engaging opposed side portions thereof.

Each bracket includes two spaced apart clamping elements complementary with side portions of a respective violin and an intermediate support means disposed between the respective clamping elements for engaging bottom portion of the respective violin.

A securing means 106 for securing the respective bracket to the base 102. The securing means 106 includes a cylinder 108, a first member 110, a second member 112 and a third member 114. The cylinder 108 is placed within a slot of the securing means 106. The cylinder includes a first end, a second end and at least one radially disposed threaded socket for placing the bracket over.

The first member 110 is screwed within the slot to engage with the first end of the cylinder. The first member 110 communicates with a thumb wheel 116 through threaded portion. The second member 112 is screwed within the slot to engage with the second end of the cylinder 108, were the second member 112 is screwed opposite to the first member 110. And the third member 114 is screwed with the radially disposed threaded socket for affixing the bracket with the attachment to the musical supporting device.

Figure 2:
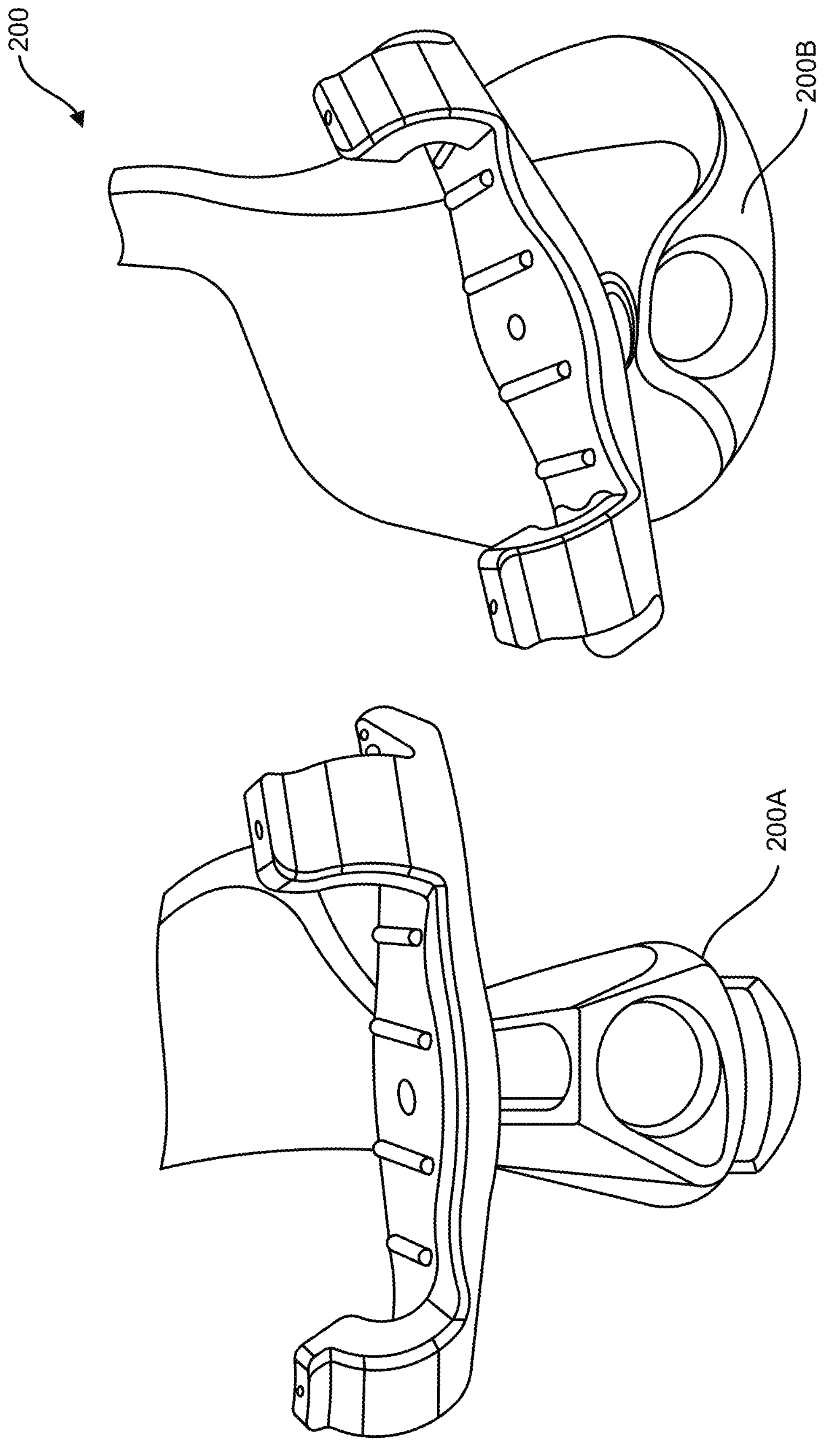
FIG. 2 illustrates axial and pivotable movement of the bracket of the musical supporting device in accordance to the present invention.

FIG. 2 illustrates the axial and pivotable movement 200 of the bracket of the musical supporting device. The earlier stage with no movement is shown in 200A and 200B illustrates the bracket with an axial movement. The securing means providing a pivotal joint disposed between the clamping member and the base and allowing pivotal movement of the respective clamping member relative to the base. The base is an elongated base.

The movement is about a longitudinal axis generally parallel with the elongation of the base to thus allow the adjustment of a transverse inclination of the undersurface relative to the support plane. Moreover, the pivotal movement is about to an angle of from about 5° to about 25°.

Moreover, the third member is screwed with the radially disposed threaded socket for affixing the bracket with the securing means to the musical supporting device. The third member is either screwed or unscrewed i.e. the third member is moved in clockwise direction or counter clockwise direction to move axially. The axial movement is about 0° to about 90°.

Figure 3:
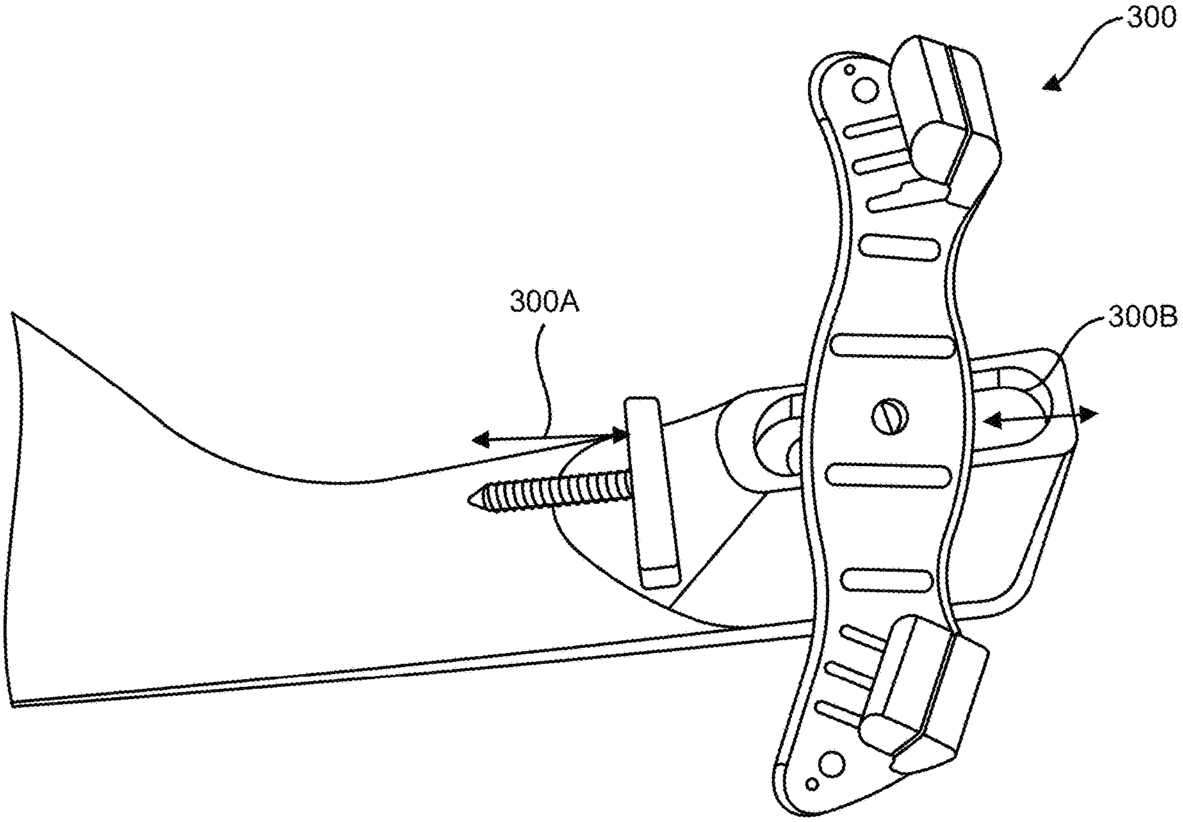
FIG. 3 illustrates the axial movement of the bracket of the musical supporting device in accordance to the present invention.

FIG. 3 illustrates the axial movement of the bracket 300 of the musical supporting device. The securing means also includes a thumb wheel along with the first member. The thumb wheel communicates with threaded portion of the first member. Moreover, the thumb wheel is rotated to extend and retract 300A the first member so that the pair of brackets move 300B i.e. the brackets move towards or away from each other.

Thus, the first member is slidable within the slot in the instrument-facing side of the body to move the pair of brackets linearly.

Figure 4:
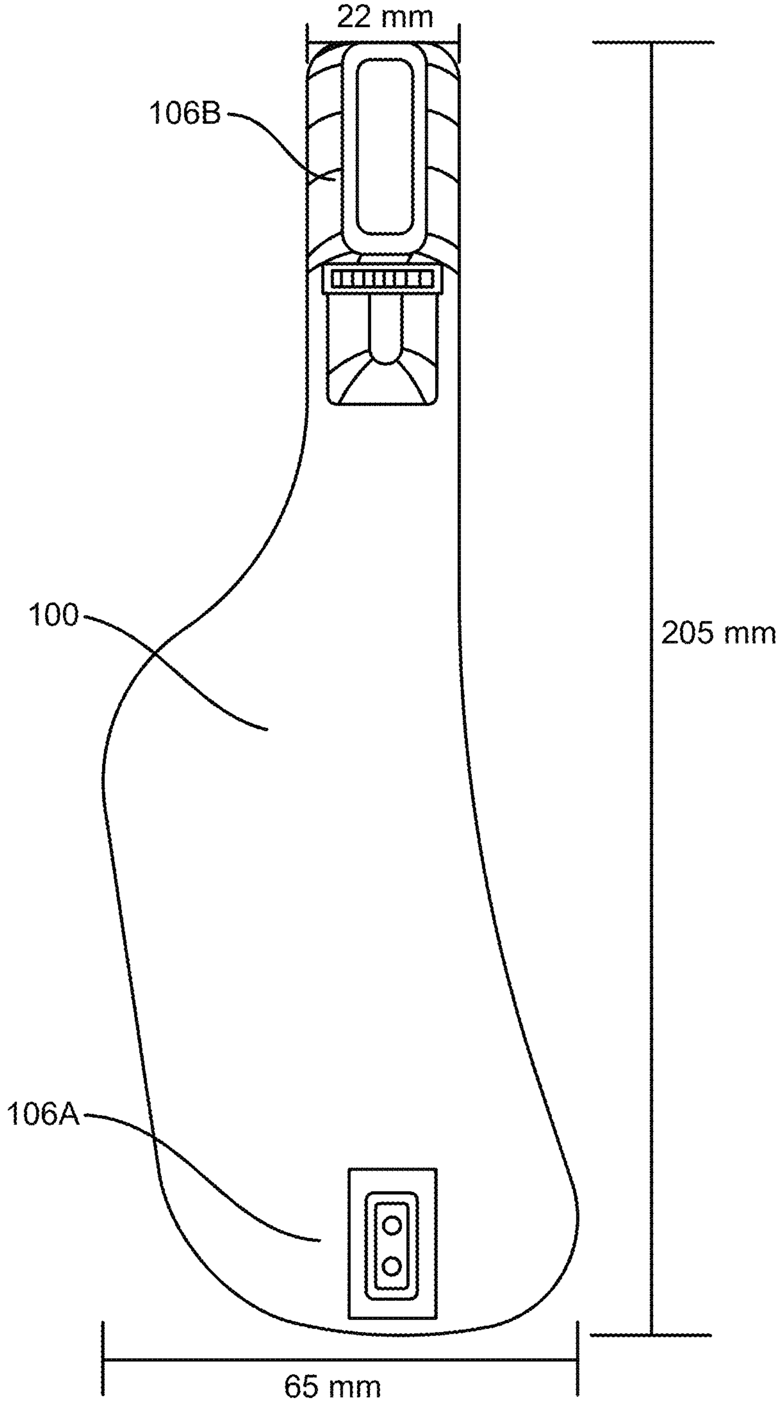
FIG. 4 illustrates a complete view of the musical supporting device in accordance to the present invention.

FIG. 4 illustrates a complete view of the musical supporting device 100. The complete view shows a pair of securing means 106 on the musical supporting device. Moreover, one of a securing means 106*a* of the pair of securing means 106 is on a proximal end with a larger width. The other securing means 106 is located at the distal end of the musical supporting device.

The length of the musical supporting device is around 200 mm and the width of the proximal side is within the range of 50-70 mm and the width of the distal end is within the range of 18-25 mm.

In another embodiment, the length of the musical supporting device is 205 mm and the width of the proximal end is 65 mm and the width of the distal end is 22 mm.

Figure 5:
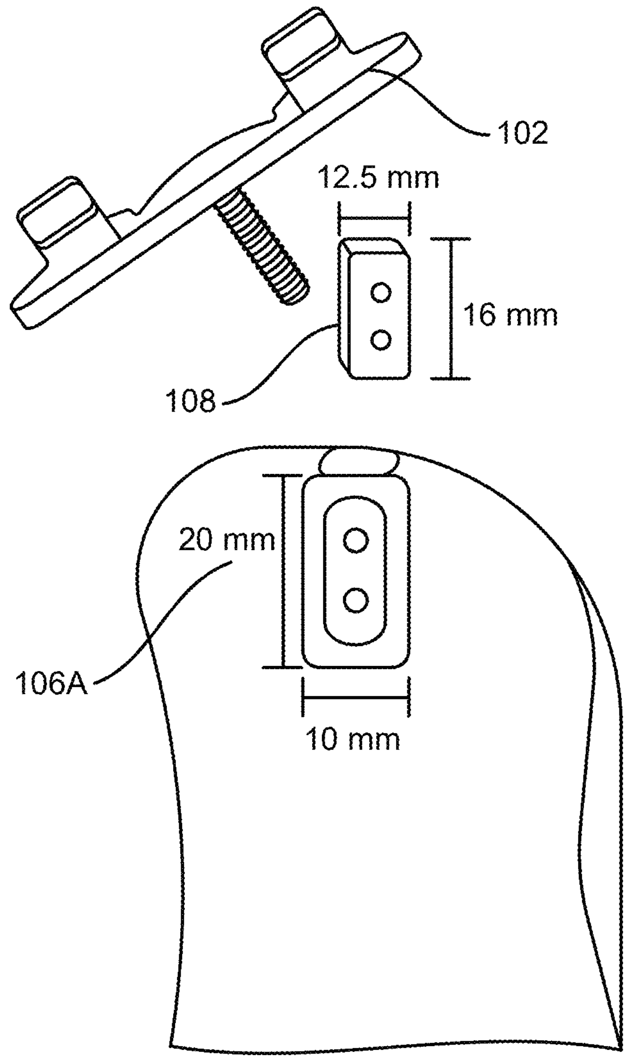
FIG. 5 illustrates a proximal view of the musical supporting device with an open configuration view of one of a securing means of a pair of securing means in accordance to the present invention.

FIG. 5 illustrates a proximal view of the musical supporting device with an open configuration view of one of a securing means of a pair of securing means. The securing means 106*a* at the proximal end includes a securing means 106 for securing the respective bracket to the base 102. The securing means 106 includes a cylinder 108, a first member 110, a second member 112 and a third member 114.

A slot at the distal end the securing means length varies from 15-25 mm and width is about 10 mm. The cylinder that fits inside the slot is about 13-18 mm in length and about 12 mm in width. The slot and the cylinder include two or more grooves to secure the third member. The distance between the two or more grooves is 6 mm and each groove diameter is about 3.8 mm.

Figure 6:
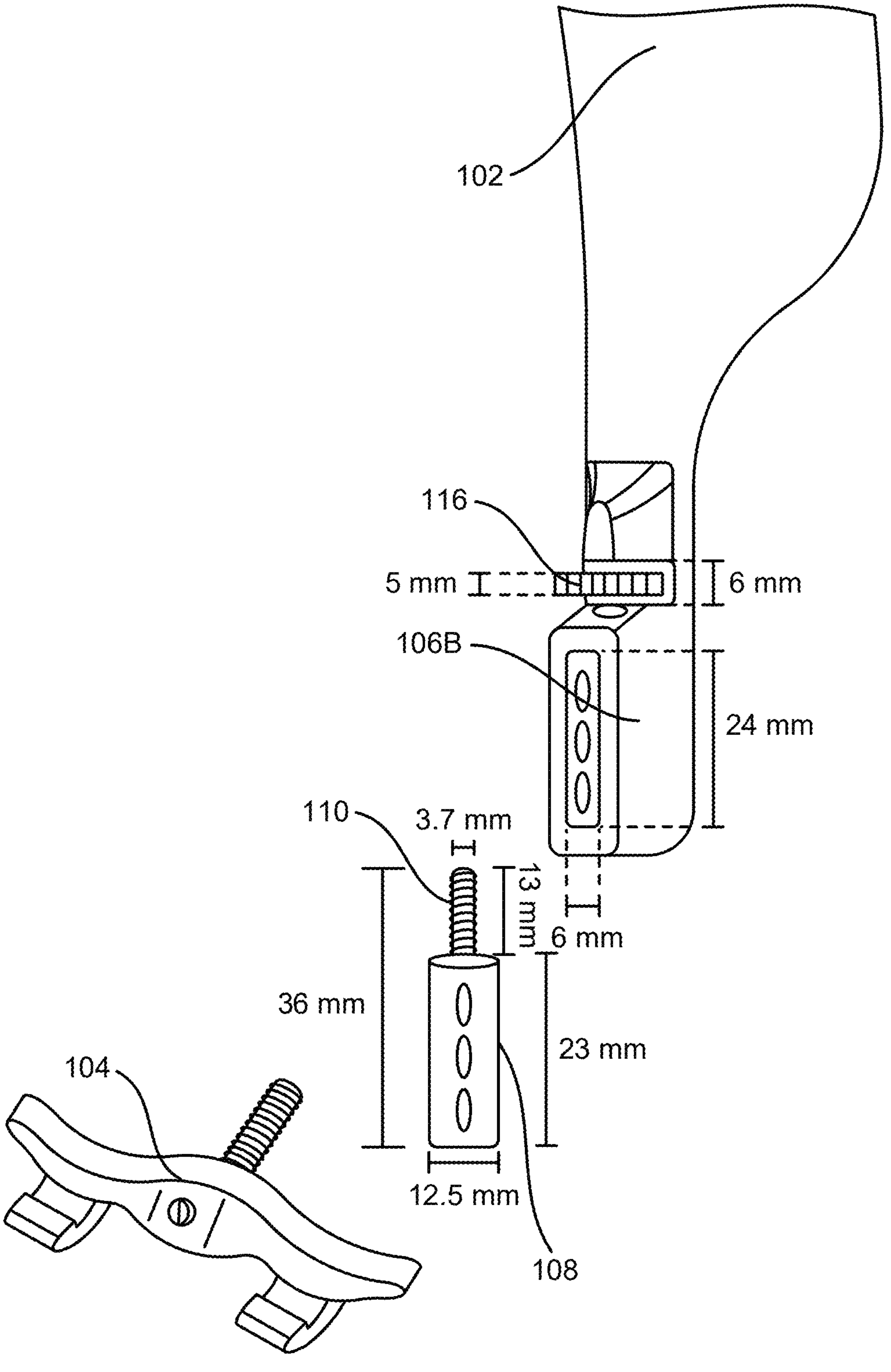
FIG. 6 illustrates a distal view of the musical supporting device with an open configuration view of another of a securing means of a pair of securing means in accordance to the present invention.

FIG. 6 illustrates a distal view of the musical supporting device with an open configuration view of another of a securing means of a pair of securing means. The securing means 106*b* includes a securing means 106 for securing the respective bracket to the base 102. The securing means 106 on the distal end includes a cylinder 108, a first member 110, a second member 112 and a third member 114 and a thumb screw 116.

A slot at the distal end the securing means length varies from 18-28 mm and width is about 14 mm. The cylinder 108 that fits inside the slot is about 18-25 mm in length and about 12 mm in width. The slot and the cylinder 108 include two or more grooves to secure the third member 114. The distance between the two or more grooves is 6 mm and each groove diameter is about 3.8 mm.

Moreover, the length of the first 110, second 112 and third member 114 is around 15 mm and the width is around 3.7 mm. Once the first 110 and the second member 112 engages with the cylinder 108 the length of the cylinder with at least one member is around 36 mm.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above detailed description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways.

Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

While, the various embodiments of the present invention have been described above, it should be understood that they have been presented by way of example only, and not of limitation. Likewise, the figure may depict an example architectural or other configuration for the invention, which is done to aid in understanding the features and functionality that can be included in the invention. The invention is not restricted to the illustrated example architectures or configurations, but the desired features can be implemented using a variety of alternative architecture and configurations.

Although, the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

The invention claimed is:

1. A musical instrument supporting device, comprising:
- a base, wherein the base includes a first end and a second end;
- a pair of brackets secured to the base at each of the first end and the second end; and
- a securing means for securing the pair of brackets at the first end and the second end, wherein the securing means includes:
  - a cylinder, wherein the cylinder is positioned within a slot of the securing means, further wherein the cylinder includes a front end, a rear end and at least one threaded socket disposed radially to position each bracket;
  - a first member, wherein the first member is screwed within the slot to engage with the front end of the cylinder; and
  - an additional member, wherein the additional member is screwed with the threaded socket for affixing each bracket to the musical supporting device.

2. The musical instrument supporting device in accordance with claim 1, wherein at least one of the pair of brackets holds shoulder rest for supporting a musical device.

3. The musical instrument supporting device in accordance with claim 2 is either of a violin, a viola or a guitar.

4. The musical instrument supporting device in accordance to claim 1, wherein the securing means further includes a thumb wheel.

5. The musical instrument supporting device in accordance with claim 4, wherein the thumb wheel engages with a threaded portion of the first member, further wherein the thumb wheel rotates to extend and retract the first member for moving each of the pair of brackets.

6. The musical instrument supporting device in accordance with claim 1, wherein the securing means provides both linear and radial movement of the pair of brackets.

* * * * *